W. BIELICKE.
OBJECTIVE LENS.
APPLICATION FILED APR. 24, 1916.
1,202,021.
Patented Oct. 24, 1916.
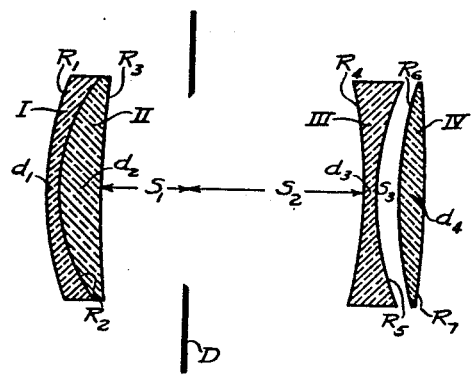

UNITED STATES PATENT OFFICE.

WILLIAM BIELICKE, OF ROCHESTER, NEW YORK, ASSIGNOR TO BAUSCH & LOMB OPTICAL COMPANY, OF ROCHESTER, NEW YORK, A CORPORATION OF NEW YORK.

OBJECTIVE-LENS.

1,202,021.  Specification of Letters Patent.  Patented Oct. 24, 1916.

Application filed April 24, 1916. Serial No. 93,121.

*To all whom it may concern:*

Be it known that I, WILLIAM BIELICKE, a subject of the German Emperor, residing at Rochester, in the county of Monroe, State of New York, have invented certain new and useful Improvements in Objective-Lenses; and I do declare the following to be a full, clear, and exact description of the same, reference being had to the accompanying drawings, forming a part of this specification, and to the characters of reference marked thereon.

My invention relates to objective lenses and more particularly relates to photographic lens systems known as telephoto objectives or lenses.

A characteristic feature of telephoto objective lenses is that the image distance, which is the distance from the vertex of the rear surface of the rear lens member to the focal point, is considerably shorter than the equivalent focus of the lens system comprising the telephoto lens. Therefore, if we apply a telephoto objective to a camera adapted to employ an objective of the usual type, having an image distance that is approximately equal to its equivalent focal length, the result will be greater magnification or a larger image, without any change in the camera excepting the substitution of a telephoto lens for an ordinary lens.

Known forms of telephoto lenses usually comprise two members, namely: a positive member consisting of a plurality of lens elements that are cemented together, which member is arranged to receive light, and a negative member consisting of a plurality of lens elements that are cemented together, which negative member is arranged behind the positive lens in spaced relation thereto and in the path of light transmitted by the positive member.

Objects of my invention are to provide a telephoto objective of shorter length, having shallow curves, greater freedom from distortion and employing thinner lens elements than telephoto lenses of the same aperture heretofore known, and to provide a lens that is lighter in weight and easier and cheaper to manufacture than known forms of telephoto lenses.

To these and other ends my invention consists in an objective comprising three members, namely: a front member which is a positive lens composed of a plurality of lens elements cemented together and which member is arranged in a position in which it is adapted to receive light; an intermediate member which is a single negative lens arranged in the path of light transmitted by the front positive member, with a comparatively large air space separating it from the front member; and a rear member consisting of a single positive lens arranged in the path of light transmitted by the intermediate member with a comparatively small air space separating it from the intermediate member.

In the accompanying drawings I have shown the lens system of a telephoto objective constituting an embodiment of my invention. In this figure the light is presumed to be incident on the extreme left hand surface $R_1$ of the front member I—II and to pass from left to right through the intermediate member III and the rear member IV.

The front member I—II of a telephoto lens system made in accordance with my invention, is a compound positive lens comprising a negative meniscus lens I, to the concave surface $R_2$ of which is cemented the convex surface $R_2$ of a positive meniscus lens II and the focal length of this compound lens is preferably five tenths of the focal length of the combined lens system. The negative meniscus lens I, is made of glass having a higher refractive index and a greater dispersive power than the glass of which the positive meniscus lens is made. By cementing the lenses I—II together as shown, a dispersive surface is obtained at $R_2$ which corrects the spherical and chromatic aberration to such a degree as to compensate for the aberrations inherent in the negative member III and the positive member IV. The resulting compound lens has an entrance surface $R_1$ upon which light from the object to be imaged by the lens system is incident, and an exit surface $R_3$ from which the light transmitted by the lens emerges. The meniscus form of this front member insures minimum astigmatic aberration.

In order to obtain a relatively short image distance I employ for the intermediate member, a relatively strong negative lens III having a focal length amounting to approximately two tenths of the combined focal length of the lens system. This negative lens III, I place behind and co-axial with the front member I—II, at a considerable distance therefrom, as indicated by the sum of the dimensions $S_1$ and $S_2$, which I term the greater air space. The negative lens member III being in the path of light transmitted by the front positive member I—II and being of stronger power than said positive member, causes the light rays that emanate from the latter as convergent light rays to diverge after passing through said negative lens III. The surface $R_4$ of the negative lens III is the entrance surface and the surface $R_5$ thereof is its exit surface. By making the negative member III of a glass having a refractive index of not less than 1.60 I am enabled to use comparatively shallow curves for the surfaces $R_4$ and $R_5$ and thus reduce the zonal aberration of the negative member III to a minimum. With a lens system consisting of a combination of a positive lens I—II and a negative lens III arranged as shown and hereinabove described, a negative focal length is obtained. This negative focal length should be, numerically, equal to or about equal to the focal length of the combined system.

The resultant positive focal length which is necessary to form a real image I obtain by placing a third member IV, consisting of a positive lens having a focal length amounting to about three tenths of the focal length of the combined system, in position in the path of light emerging from the negative member III whereby the positive member IV is coaxial with the members I—II and III and disposed in spaced relation with the negative member III on that side of said negative member opposite the side on which the positive member I—II is arranged. The lesser air space $S_3$ which separates the positive member IV from the intermediate or negative member III is the means of reducing the error of distortion to a minimum, the reduction of this error in fact being greater than has heretofore been possible in any telephoto lens. By moving the positive member IV near the negative member III a pin-cushion shaped distortion is obtained and by moving it farther away from said negative member, barrel shaped distortion results. This result is caused by the different refractive power of the single positive lens in its different zones: Thus, the farther from the optical axis that a ray which passes through the center of the diaphragm, traverses the positive lens, the stronger will this ray be diverted from its course toward the optical axis. It is essential that the lens IV be made of a glass of higher refractive index and greater dispersive power than the glass of which the negative member III is made in order to obtain a flat field and chromatic correction. The diaphragm indicated by D in the drawing is placed as shown at a distance $S_1$ from the rear vertex of the composite lens I—II.

The data for making a lens system according to my invention and as shown in the drawing, to produce a telephoto objective having a focal length of 305 mm. and an aperture of F:6.8 is as follows:

| Lens. | Curvature. | Thickness and spaces. | $n_D$ | $n_{G'}$ | $\nu$ |
|---|---|---|---|---|---|
| I | $R_1= + 65.1$ <br> $R_2= + 38.3$ | $d_1$ 2.7 | 1.6481 | 1.6737 | 33.8 |
| II | $R_2= + 38.3$ <br> $R_3= +238.0$ | $d_2$ 8.5 <br> $S_1$ 17.0 <br> $S_2$ 35.5 | 1.6126 | 1.6259 | 58.6 |
| III | $R_4= - 99.7$ <br> $R_5= + 57.9$ | $d_3$ 2.1 <br> $S_3$ 4.2 | 1.6066 | 1.6247 | 43.7 |
| IV | $R_6= + 84.4$ <br> $R_7= -222.4$ | $d_4$ 4.2 | 1.6481 | 1.6737 | 33.8 |

The characters $R_1$ to $R_7$ inclusive indicate the curvatures of the lenses as shown in the drawings from left to right respectively; thus the two surfaces of the lens I, are indicated by $R_1$ and $R_2$; those of lens II by $R_2$ and $R_3$; those of the lens III, by $R_4$ and $R_5$; and those of the lens IV by $R_6$ and $R_7$. The light is presumed to be incident from the left and to travel from left to right, and all curves that are convex toward the incident light are positive and those that are concave toward the incident light are negative.

The character S with its sub-numerals 1, 2, and 3 indicates the axial dimensions of the various air spaces. Thus $S_1$ is the distance from the rear vertex of the lens I—II to the plane of the diaphragm and $S_2$ is the distance from the plane of the diaphragm to the front vertex of the lens member III. Thus $S_1$ plus $S_2$ equals the axial length of the greater air space or the separation between the members I—II and III and $S_3$ is the axial length of the lesser air space or the separation between the members III and IV.

The characters $n_D$ and $n_{G'}$ respectively, denote the refractive indexes, for the D line and for the G' line of the spectrum, of the glasses of which the lenses I, II, III and IV are made.

The character $\nu$ denotes the relative dispersion of the glass of which each lens is made and is generally expressed by the formula:

$$\nu = \frac{n_D - 1}{n_F - n_C}$$

Like characters of reference appearing in the above table and in the drawing refer to the same data.

Having thus described my invention, what I claim and desire to secure by Letters Patent of the United States is:

1. In an objective lens system having an image distance of short length relatively to the equivalent focal length thereof, the combination of a compound positive meniscus front lens having a convex entrance surface and a dispersive surface formed by cementing the concave surface of a negative meniscus component to the convex surface of a positive meniscus component having a lower refractive index and a lower dispersive power than said negative component, a negative intermediate lens arranged in the path of light transmitted by the front lens and separated therefrom by a greater air space, and a positive lens arranged in the path of light transmitted jointly by the front lens and the intermediate lens and separated from the adjacent surface of the latter by a lesser air space.

2. In an objective lens system having an image distance of short length relatively to the equivalent focal length thereof, the combination with a compound meniscus front lens, of a negative lens made of a glass having a refractive index of not less than 1.60 arranged in the path of light transmitted by said front lens and separated therefrom by a greater air space, and a positive lens made of a glass having a higher refractive index and a greater dispersive power than the negative lens, arranged in the path of light transmitted jointly by the front lens and the negative lens, and separated from the adjacent surface of the latter by a lesser air space.

3. In an objective lens system having an image distance of short length relatively to the equivalent focal length thereof, the combination of a compound positive front lens having a focal length not greater than five tenths of the equivalent focal length of the combined lens system, a negative intermediate lens having a focal length not greater than two tenths of the said focal length arranged in spaced relation to the front lens and in the path of light transmitted thereby, and a positive lens having a focal length not greater than three tenths of said equivalent focal length arranged behind the intermediate lens in spaced relation thereto and in the path of light transmitted jointly by the forward and intermediate lenses.

4. In an objective lens system having an image distance of short length relatively to the equivalent focal length thereof, the combination of a compound positive front lens having a focal length not greater than five tenths of the equivalent focal length of the combined lens system, a negative intermediate lens having a focal length not greater than two tenths of said equivalent focal length arranged in the path of light transmitted by the front lens and separated therefrom by a greater air space, and a positive lens having a focal length not greater than three tenths of said equivalent focal length arranged in the path of light transmitted jointly by the front lens and the intermediate lens and separated from the adjacent surface of the latter by a lesser air space.

WILLIAM BIELICKE.

Witnesses:
   WILLIAM G. WOODWORTH,
   GEORGE A. PAGE.

Copies of this patent may be obtained for five cents each, by addressing the "Commissioner of Patents, Washington, D. C."